(12) United States Patent
Kang et al.

(10) Patent No.: US 8,606,442 B2
(45) Date of Patent: Dec. 10, 2013

(54) CONTROL SYSTEM AND METHOD FOR HYBRID CONSTRUCTION MACHINE

(75) Inventors: Jong Min Kang, Changwon-si (KR); Ahn Kyun Jung, Changwon-si (KR); Chun Seung Lee, Gimhae-si (KR); Jae Hong Kim, Gimhae-si (KR); Eui Chul Kim, Changwon-si (KR); Jung Sun Jo, Changwon-si (KR); Sung Kon Kim, Gimhae-si (KR); Sung Wan Koo, Busan (KR)

(73) Assignee: Volvo Construction Equipment Holding SSweden AB, Eskilstuna (SE)

( * ) Notice: Subject to any disclaimer, the term of this patent is extended or adjusted under 35 U.S.C. 154(b) by 572 days.

(21) Appl. No.: 12/821,574

(22) Filed: Jun. 23, 2010

(65) Prior Publication Data

US 2011/0029175 A1 Feb. 3, 2011

(30) Foreign Application Priority Data

Jul. 29, 2009 (KR) ........................ 10-2009-0069575

(51) Int. Cl.
*B60W 20/00* (2006.01)
*B60W 10/08* (2006.01)
*B60K 6/48* (2007.10)

(52) U.S. Cl.
USPC .............................. 701/22; 903/903; 180/53.8

(58) Field of Classification Search
USPC ..................... 701/22, 903; 903/903; 180/53.8
See application file for complete search history.

(56) References Cited

U.S. PATENT DOCUMENTS

| 2002/0125052 | A1* | 9/2002 | Naruse et al. ................ 180/53.8 |
| 2004/0088103 | A1* | 5/2004 | Itow et al. .................... 701/110 |
| 2004/0235613 | A1* | 11/2004 | Aoki et al. ........................ 477/3 |
| 2005/0145426 | A1* | 7/2005 | Gray, Jr. ....................... 180/65.4 |
| 2009/0320461 | A1* | 12/2009 | Morinaga et al. ............... 60/431 |

FOREIGN PATENT DOCUMENTS

WO WO 2007049767 A1 * 5/2007

OTHER PUBLICATIONS

English translation of WO2007049767.*

* cited by examiner

*Primary Examiner* — Fadey Jabr
*Assistant Examiner* — Yazan A Soofi
(74) *Attorney, Agent, or Firm* — Ladas & Parry LLP

(57) ABSTRACT

A control system and method for a hybrid construction machine is provided. The control system for a hybrid construction machine includes an engine, a hydraulic pump driven by the engine to drive a hydraulic actuator, a motor-generator driven by the engine to generate electricity and to drive the hydraulic pump as a motor supplementing the engine, an energy storage device charged with electric energy generated by the motor-generator and supplying the electric energy for motor operation of the motor-generator, a mode detector detecting a working mode of the engine, a torque detector detecting an output torque of the hydraulic pump, a memory storing upper and lower baselines of an engine torque set per working mode of the engine, and a hybrid controller comparing the detected output torque of the hydraulic pump with the upper and lower baselines set according to the detected working mode, controlling power generation of the motor-generator so that the engine is loaded as much as much as a short value if the output torque is less than the lower baseline, and controlling the motor operation of the motor-generator so that the engine output is supplemented as much as an excessive value if the output torque exceeds the upper baseline.

8 Claims, 11 Drawing Sheets

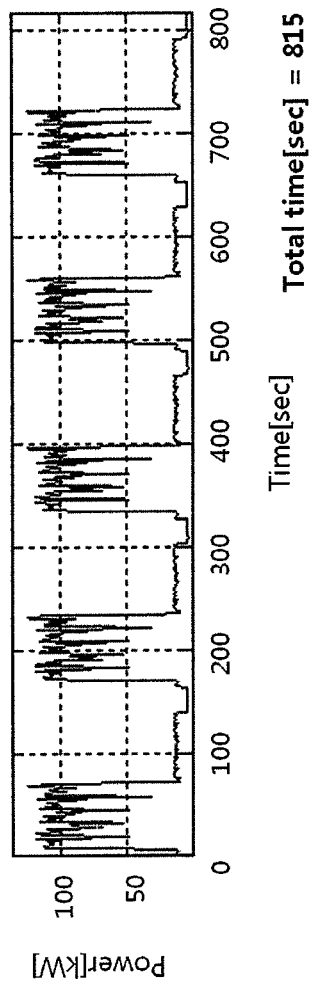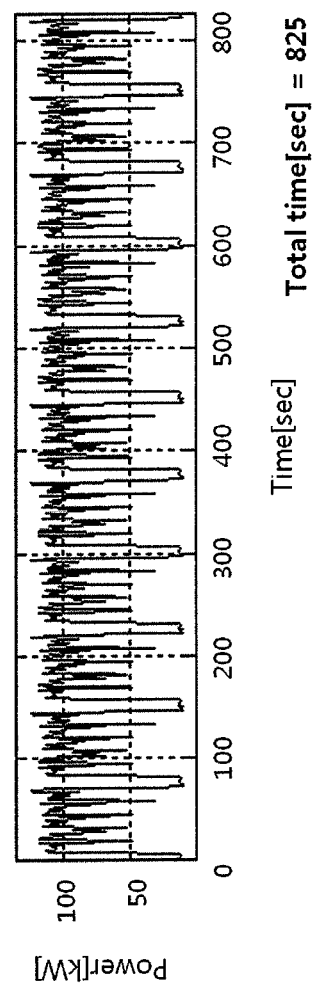

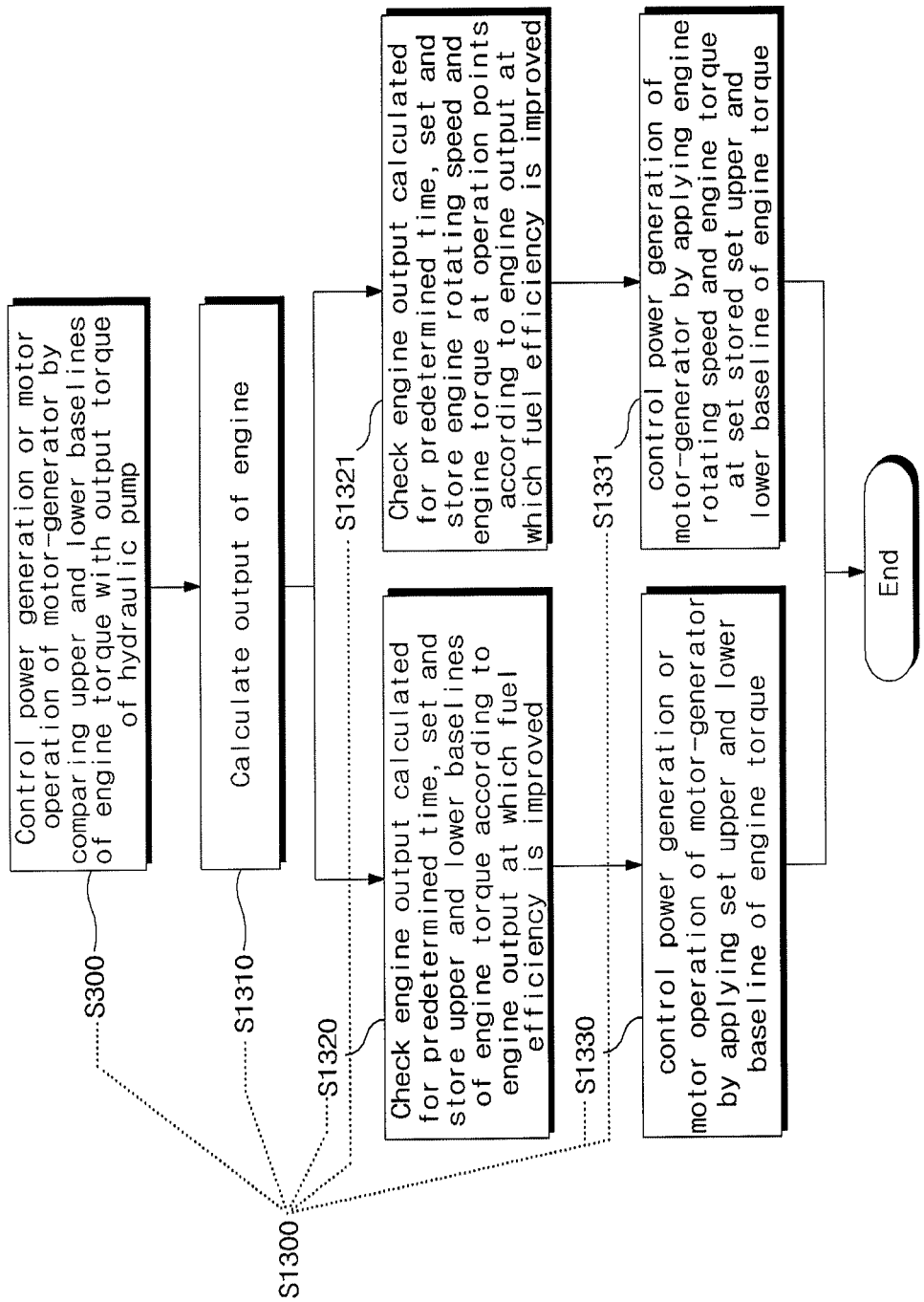

CONTROL SYSTEM AND METHOD FOR HYBRID CONSTRUCTION MACHINE

CROSS-REFERENCE TO RELATED APPLICATION

This application is based on and claims priority from Korean Patent Application No. 10-2009-69575, filed on Jul. 29, 2009 in the Korean Intellectual Property Office, the disclosure of which is incorporated herein in its entirety by reference.

BACKGROUND OF THE INVENTION

1. Field of the Invention

The present invention relates to a control system and method for a hybrid construction machine. More particularly, the present invention relates to a control system and method for a hybrid construction machine, which can optimize fuel efficiency of a hybrid construction machine system composed of a motor-generator and a typical fuel engine.

2. Description of the Prior Art

In general, a construction machine such as an excavator in the related art has a hydraulic driving system which drives a hydraulic pump by a fuel engine and drives an actuator by hydraulic pressure. The construction machine such as an excavator in the related art performs not only a work that requires the maximum output but also a work that requires an output lower than the maximum output, for example, about 80% or 50% of the maximum output. In the case of performing the work with such a low output, the engine efficiency and the fuel efficiency deteriorate.

FIG. 1 is a necessary torque output relationship diagram of an excavator system in the related art. As illustrated in FIG. 1, in a hydraulic excavator in the related art, an opening area of a main control valve (MCV) 7 is adjusted in accordance with an output of a pilot valve 6 through a user's manipulation of a lever 5. Hydraulic fluid discharged from a hydraulic pump 13 is transferred to respective hydraulic systems with its flow rate adjusted in accordance with the opening area of the MCV 7. Since the driving of the hydraulic pump 13 is performed by a fuel engine 10, the efficiency thereof is relatively low.

FIG. 4 is a view illustrating an engine fuel efficiency map of a hydraulic excavator in the related art. Referring to FIG. 4, a typical engine system in the related art is designed so that the efficiency of a region which has the highest frequency in use is optimized. Accordingly, in a low-output region 22 or a high-output region 20 which has a low frequency in use, the efficiency becomes lowered.

In the construction machine such as the hydraulic excavator in the related art, it is sometimes required to perform working as greatly changing an engine output so as to cope with great load change, and it is required to seek improvement of the engine fuel efficiency by effectively utilizing the engine output. Accordingly, a hybrid technology using an electric motor-generator that is adopted in a hybrid vehicle has been planned to be applied to an excavator. That is, a hybrid construction machine, such as a hybrid excavator, in which an engine is connected to an electric motor-generator, has been proposed. According to the hybrid construction machine, in the case of performing a light-load operation, the motor-generator is operated to generate power to charge a battery using a portion of the engine output, while in the case of performing a heavy-load operation, electric energy is provided from the battery to supplement the engine.

However, the construction machine such as the excavator has the characteristics of an engine output, a torque/speed operation region, and a power transfer device which are quite different from those of a hybrid vehicle, and thus it is not easy to apply the hybrid technology to the construction machine. According to a hybrid construction machine control system proposed in the related art, in which the motor-generator generates power to charge a battery using surplus engine output torque in the case of performing the light-load operation, while in the case of performing the heavy-load operation, electric energy charged in the battery is supplied to the motor-generator to operate the motor-generator as a motor, so that the engine is supplemented as much as the shortage of the engine output torque, it is difficult to seek improvement of the fuel efficiency by effectively utilizing the output of the engine of the construction machine such as the excavator which has the characteristics of working region of diverse loads, engine output, torque/speed operation region, and power transfer device which are quite different from those of the hybrid vehicle. In particular, since the excavator performs various kinds of works, of which working loads are different from one another, such as excavating, dipping-out, leveling, pounding, and the like, the transmission technology for the hybrid vehicle is not adopted in the hybrid excavator in the related art, and thus it is very difficult to optimize the fuel efficiency.

Further, in the construction machine such as the excavator, if the relationship between the kind (or mode) of the work and the engine output or the battery charging state is not considered, problems, such as energy waste, deterioration of working efficiency, and the like, may occur.

SUMMARY OF THE INVENTION

Accordingly, the present invention has been made to solve the above-mentioned problems occurring in the prior art while advantages achieved by the prior art are maintained intact.

The present invention proposes hybrid technology that can be applied to a construction machine such as an existing excavator which has no transmission and of which the output is frequently and abruptly changed, and hybrid construction machine control technology capable of optimizing the fuel efficiency.

The present invention also proposes to provide control technology with upper and lower baseline control algorithm, which sets upper and lower baselines of an engine output torque range having a high engine output efficiency per working area in order to optimize the fuel efficiency in diverse working areas of the construction machine such as the excavator and even on condition that the load change is severe.

The present invention also proposes to provide technology for further optimizing the fuel efficiency by installing a swing motor-generator for a swing operation of an upper swing structure, which is operated by electric energy to accelerate the swing operation and to generate power to be charged during deceleration of the swing operation.

The present invention also proposes to modify and apply upper and lower baselines of the engine output torque per working mode, which can further improve the fuel efficiency by measuring the power required for a hydraulic actuator for a predetermined time.

In one aspect of the present invention, there is provided a control system for a hybrid construction machine, including an engine, a hydraulic pump which is driven by the engine to drive a hydraulic actuator with discharged hydraulic fluid, a motor-generator which is driven by the engine to generate electricity and to drive the hydraulic pump as a motor supplementing the engine, and an energy storage device which is charged with electric energy generated by the motor-generator and which supplies the electric energy for motor operation of the motor-generator, which further includes a mode detection means for detecting a working mode of the engine; a torque detection means for detecting an output torque of the hydraulic pump that is required to drive the hydraulic actuator; a memory means for storing upper and lower baselines of an engine torque set per working mode of the engine; and a hybrid control means for comparing the output torque of the hydraulic pump detected by the torque detection means with the upper and lower baselines set according to the working mode detected by the mode detection means, controlling power generation of the motor-generator so that the engine is loaded as much as much as a short value if the output torque is less than the lower baseline, and controlling the motor operation of the motor-generator so that the engine output is supplemented as much as an excessive value if the output torque exceeds the upper baseline.

The control system according to a preferred embodiment of the present invention further includes a charge amount detection means for detecting a charge amount of the energy storage device; wherein the hybrid control means controls the motor-generator not to generate power if the charge amount detected by the charge amount detection means is equal to or larger than a high limit value, and controls the motor-generator to generate the power if the charge amount is smaller than the high limit value, in the case where the output torque is less than the lower baseline; the hybrid control means controls the motor-generator not to operate as a motor if the charge amount detected by the charge amount detection means is equal to or smaller than a low limit value, and controls the motor-generator to operate as a motor if the charge amount exceeds the low limit value, in the case where the output torque exceeds the upper baseline; and the hybrid control means controls the motor-generator to generate the power if the charge amount detected by the charge amount detection means is equal to or smaller than the low limit value in the case where the output torque is within a range of the upper baseline to the lower baseline.

In the control system according to a preferred embodiment of the present invention, the mode detection means detects a start region of the engine, an idling mode that is an output standby state, or a low-torque idling region per working mode of the engine; the memory means stores operation points of a predetermined engine rotating speed and the engine torque at which the fuel efficiency is improved when the motor-generator generates the power in an idling state; and the hybrid control means controls the motor-generator to generate the power by the engine driving according to the engine rotating speed and the engine torque of the operation points if the idling mode or the low-torque idling region is detected by the mode detection means.

The control system according to a preferred embodiment of the present invention further includes a charge amount detection means for detecting a charge amount of the energy storage device; wherein in the case where the idling mode or the low-torque idling region is detected, the hybrid control means controls the power generation of the motor-generator so that the charging is made up to the high limit value if the charge amount detected by the charge amount detection means is equal to or smaller than the high limit value, controls the engine to be off if the charge amount detected by the charge amount detection means is equal to or larger than the high limit value, and controls the power generation of the motor-generator so that the charging is made up to the high limit value if the charge amount detected by the charge amount detection means is between the low limit value and the high limit value.

The control system according to a preferred embodiment of the present invention further includes a swing motor-generator which operates as a motor that accelerates a swing operation of an upper swing structure by energy supplied from the energy storage device, and which operates as a generator that generates power by moment of inertia during deceleration of the swing operation of the upper swing structure; wherein the hybrid control means controls the swing motor-generator to operate as a generator to charge the energy storage device with generated electric energy when the swing operation of the upper swing structure is decelerated, and controls the supply of the electric energy from the energy storage device for a motor operation of the swing motor-generator.

The control system according to a preferred embodiment of the present invention further includes an engine output calculation means for calculating an engine output; wherein the hybrid control means checks the engine output calculated by the engine output calculation means for a predetermined time in a predetermined working mode, sets the upper and lower baselines of the engine torque according to the engine output at which the fuel efficiency is improved to store the upper and lower baselines in the memory means, and controls the power generation or the motor operation of the motor-generator by applying the stored upper and lower baselines of the engine torque.

The control system according to a preferred embodiment of the present invention further includes an engine output calculation means for calculating an engine output; wherein the hybrid control means checks the engine output calculated by the engine output calculation means for a predetermined time in a predetermined working mode, sets the engine rotating speed and the engine torque at the operation points according to the engine output at which the fuel efficiency is improved to store the engine rotating speed and the engine torque in the memory means, and controls the power generation of the motor-generator by applying the stored engine rotating speed and the engine torque at the operation points.

In another aspect of the present invention, there is provided a control method in a control system for a hybrid construction machine, including an engine, a hydraulic pump which is driven by the engine to drive a hydraulic actuator with discharged hydraulic fluid, a motor-generator which is driven by the engine to generate electricity and to drive the hydraulic pump as a motor supplementing the engine, and an energy storage device which is charged with electric energy generated by the motor-generator and which supplies the electric energy for motor operation of the motor-generator, which includes a mode detection step of detecting a working mode of the engine; a torque detection step of detecting an output torque of the hydraulic pump that is required to drive the hydraulic actuator; and a hybrid control step of comparing the output torque of the hydraulic pump detected in the torque detection step with upper and lower baselines of a predetermined engine torque according to the working mode detected in the mode detection step, controlling power generation of the motor-generator so that the engine is loaded as much as much as a short value if the output torque is less than the lower baseline, and controlling the motor operation of the motor-generator so that the engine output is supplemented as much as an excessive value if the output torque exceeds the upper baseline.

In the control method according to a preferred embodiment of the present invention, the mode detection step detects a start region of the engine, an idling mode that is an output standby state, or a low-torque idling region per working mode of the engine; and if the idling mode or the low-torque idling region is detected in the mode detection step, the hybrid control step controls the motor-generator to generate the power by the engine driving according to the engine rotating speed and the engine torque at operation points of a predetermined engine rotating speed and the engine torque at which the fuel efficiency is improved during the power generation operation of the motor-generator in an idling state.

In the control method according to a preferred embodiment of the present invention, the hybrid control step further includes an engine output calculation step of calculating an engine output; a corrected torque baseline setting step of checking the engine output calculated in the engine output calculation step for a predetermined time in a predetermined working mode detected in the mode detection step, and setting and storing the upper and lower baselines of the engine torque according to the engine output at which the fuel efficiency is improved; and a corrected operation control step of controlling the power generation or the motor operation of the motor-generator by applying the set upper and lower baselines of the engine torque.

In the control method according to a preferred embodiment of the present invention, the hybrid control step further includes an engine output calculation step of calculating an engine output; a corrected operation point setting step of checking the engine output calculated in the engine output calculation step for a predetermined time in a predetermined working mode detected in the mode detection step, and setting and storing the engine rotating speed and the engine torque at operating points according to the engine output at which the fuel efficiency is improved; and a corrected power generation control step of controlling the power generation of the motor-generator by applying the set engine rotating speed and the engine torque at the operation points.

As preferred embodiments of the present invention, embodiments according to diverse possible combination of the above-described technical features may be included.

With the above-described construction, in comparison to the technology in the related art in which it is difficult to apply the hybrid technology developed through the existing hybrid vehicle to the construction machine due to the nonexistence of a transmission and the abrupt and frequent change of the output torque, a superior fuel efficiency improvement effect can be expected by developing and applying baseline control technology, which sets upper and lower baselines of an engine output torque range having high engine output efficiency for diverse working areas and performs control based on the upper and lower baselines, to the construction machine.

Also, further improved engine efficiency and fuel efficiency can be expected by installing a swing motor-generator for a swing operation of an upper swing structure, which is operated by electric energy to accelerate the swing operation and to generate power to be charged during deceleration of the swing operation.

Also, the fuel efficiency can be further improved by modifying and applying upper and lower baselines of the engine output torque per working mode through measurement of the power required for a hydraulic actuator for a predetermined time.

BRIEF DESCRIPTION OF THE DRAWINGS

The above and other objects, features and advantages of the present invention will be more apparent from the following detailed description taken in conjunction with the accompanying drawings, in which:

FIG. 8A is a graph illustrating an engine output that is required for an excavator operation that repeats working and waiting;

FIG. 8B is a graph illustrating an engine output that is required for an excavator operation that repeats working without waiting;

FIG. 11 is a flowchart illustrating a control method for a hybrid construction machine according to still another embodiment of the present invention.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

First, a control system for a hybrid construction machine according to an embodiment of the present invention will be described.

Figure 1:
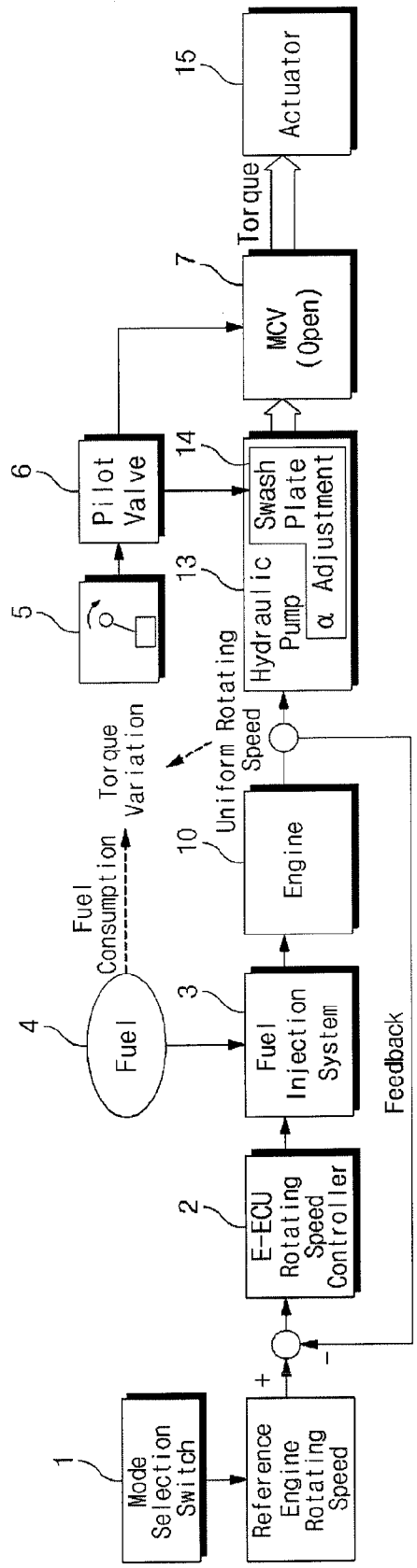
FIG. 1 is a necessary torque output relationship diagram of an excavator system in the related art.
Figure 2:
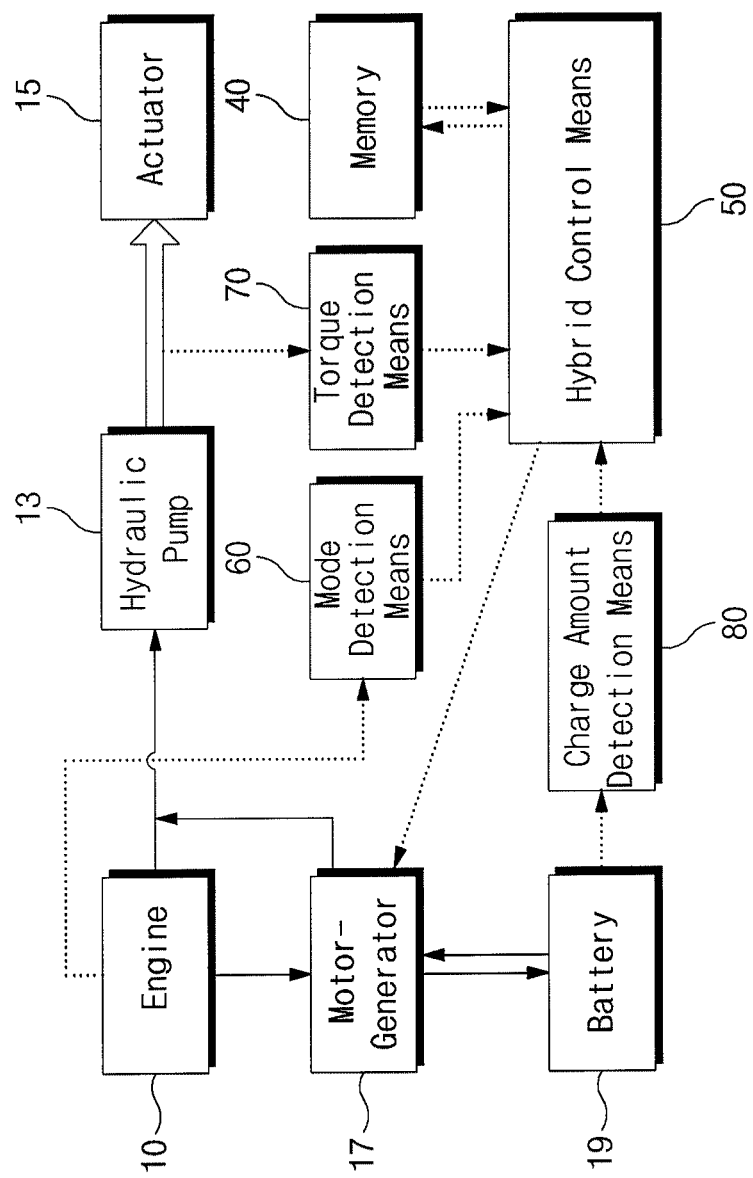
FIG. 2 is a schematic block diagram illustrating the configuration of a control system for a hybrid construction machine according to an embodiment of the present invention.
Figure 3:
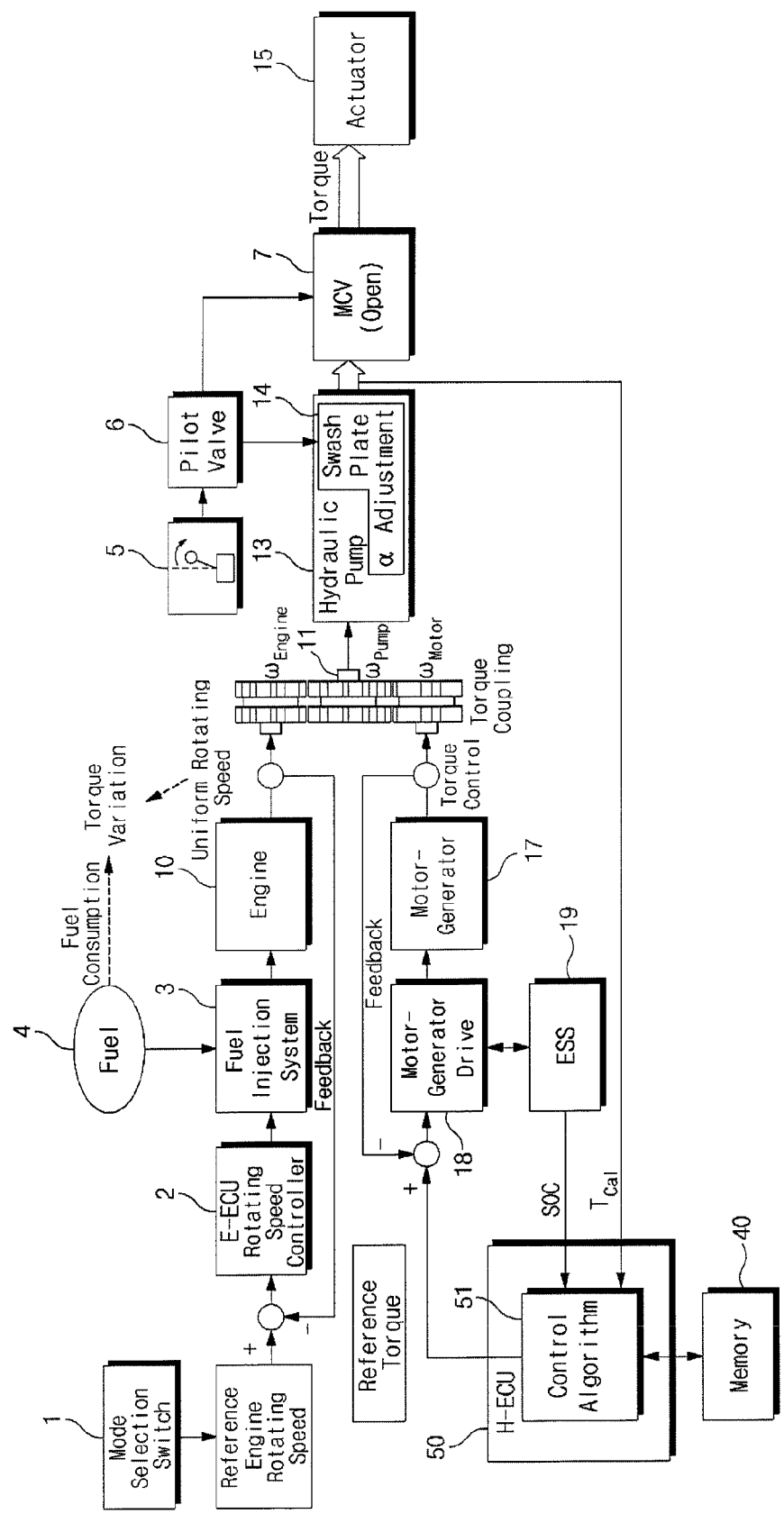
FIG. 3 is a necessary torque output relationship diagram of a control system for a hybrid construction machine according to an embodiment of the present invention.

FIG. 2 is a schematic block diagram illustrating the configuration of a control system for a hybrid construction machine according to an embodiment of the present invention, and FIG. 3 is a necessary torque output relationship diagram of a control system for a hybrid construction machine according to an embodiment of the present invention.

Referring to FIGS. 2 and 3, a control system for a hybrid construction machine includes an engine 10, a hydraulic pump 13 which is driven by the engine 10 to drive a hydraulic actuator 15 with discharged hydraulic fluid, a motor-generator 17 which is driven by the engine 10 to generate electricity and to drive the hydraulic pump 13 as a motor supplementing the engine 10, and an energy storage device, e.g. a battery 19, which is charged with electric energy generated by the motor-generator 17 and which supplies the electric energy for motor operation of the motor-generator 17.

Referring to FIG. 3, the driving process of the engine 10 will be described. If a work mode, for example, P-mode, H-mode, G-mode, or F-mode, is selected by a mode selection switch 1, the engine revolutions, that is, engine revolutions per minute (RPM), is set to 1900 RPM, 1800 RPM, 1700 RPM, 1400 RPM, or the like, and the engine revolutions become reference engine revolutions. If fuel stored in a fuel tank 4 is injected into the engine 10 through a fuel injection system 3, the engine 10 is driven. In an embodiment of the present invention, the output of the engine according to the output torque of the hydraulic pump 13 that is required in the hydraulic actuator 15 is determined by a baseline control algorithm according to upper and lower baseline of the engine output torque having high fuel efficiency per working mode in a hybrid control means 50. The detailed explanation of the control by the baseline control algorithm will follow.

A hybrid control means 50 receives feedback of torque necessary for the system, that is, the output torque provided from the hydraulic pump 13 that corresponds to the necessary torque, and controls power generation or motor operation of the motor-generator 17 through a baseline control algorithm. In accordance with the power generation or motor operation of the motor-generator 17, a necessary output of the existing engine 10 for providing the output torque of the hydraulic pump 13 that is necessary for the hydraulic actuator 15 is determined. The motor-generator 17 is driven by a motor-generator driver 18 in accordance with the control of the hybrid control means 50. In order for the existing engine 10 to provide necessary output, the output revolutions of the engine 10 and a required output or engine output torque are fed back to an electronic control unit (E-ECU) 3. In order to provide a necessary output of the engine 10, the electronic control unit (E-ECU) 2 controls the fuel injection system 3 to vary the output or output torque of the engine 10 as maintaining the rotating speed of the engine almost constant per working mode in accordance with the fed-back output revolutions of the engine 10 and reference engine revolutions. The output torque of the engine 10 is varied by the variation of the fuel injection amount from the fuel tank 4 through the fuel injection system 3 that is controlled by the electronic control unit (E-ECU) 2.

Referring to FIG. 2, the control system for a hybrid construction machine according to an embodiment of the present invention further includes a mode detection means 60, a torque detection means 70, a memory means 40, and a hybrid control means 50. Their detailed configurations will be described.

Figure 4:
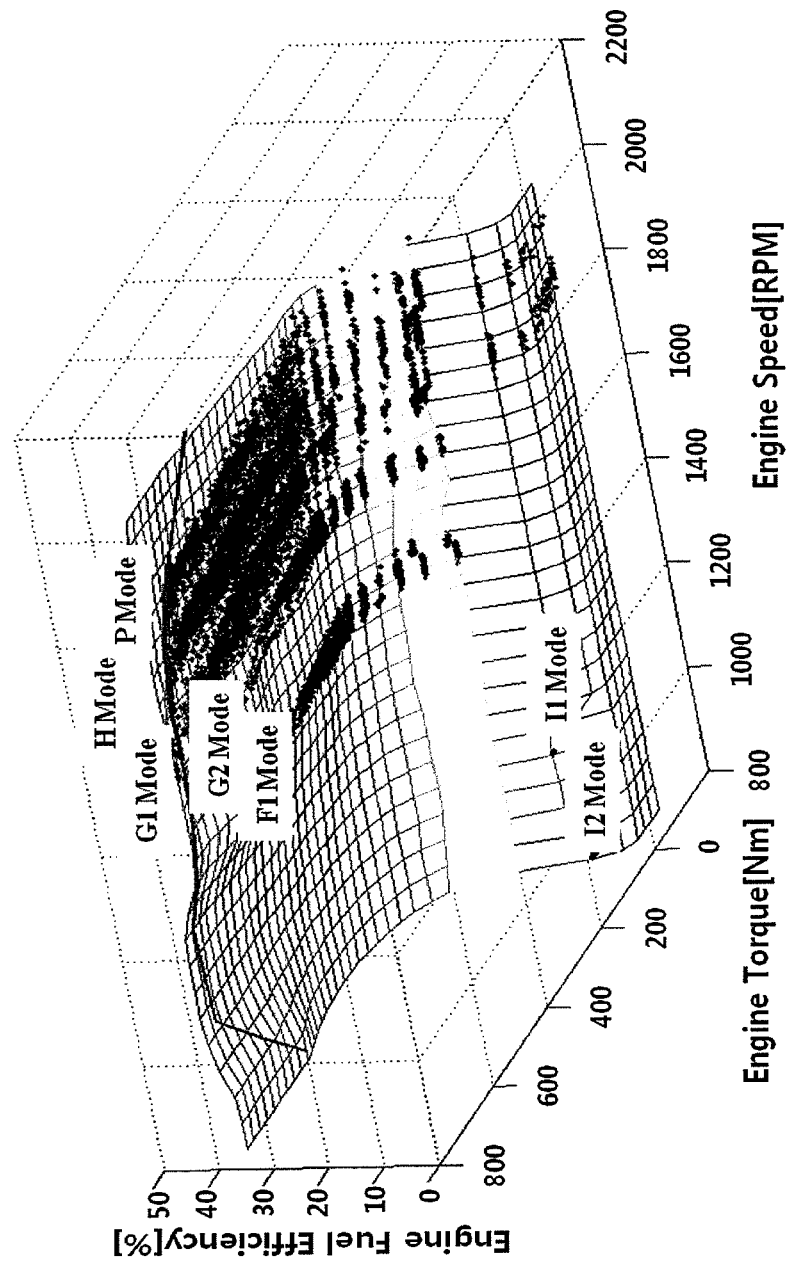
FIG. 4 is a view illustrating an engine fuel efficiency map of a hydraulic excavator in the related art.

The mode detection means 60 detects the working mode of the engine 10. Examples of working mode of the engine 10 of the excavator may be P-mode, H-mode, G-mode, F-mode, and the like. FIG. 4 shows an engine fuel efficiency map of a hydraulic excavator in the related art. Referring to FIG. 4, the working modes of the engine 10 of the excavator in the related art are indicated as P-mode, H-mode, G1-mode, G2-mode, F1-mode, and the like. These working modes are to fix the engine revolutions of the excavator. For example, if the working mode is set to P-mode, the engine is set to 1900 rpm, while if the working mode is set to H-mode, the engine is set to 1800 rpm. The working mode of the engine is selected and determined by a mode selection switch 1 of FIG. 3.

The torque detection means 70 detects the output torque of the hydraulic pump 13 that is required to drive the hydraulic actuator 15. The torque required to drive the hydraulic actuator 15 corresponds to the output provided from the hydraulic pump 13. Preferably, the torque detection means 70 detects the output torque output from the hydraulic pump 13 through the adjustment of a swash plate 14. Also, the torque that is necessary for the system may be detected by detecting the opening area or the output of a main control valve (MCV) 7.

Referring to FIG. 3, the opening area of the main control valve (MCV) 7 is adjusted in accordance with the output of a pilot value 6 through a user's operation of a lever 5. Also, the output of the hydraulic pump 13 can be directly controlled by adjusting the swash plate 14 of the hydraulic pump 13 through a valve electronic control unit (not illustrated) in accordance with the output of the pilot valve 6 through the user's operation of the lever 5. The flow rate discharged from the hydraulic pump 13 is adjusted according to the opening area of the MCV 7 to be transferred to respective hydraulic systems, or is adjusted by the swash plate 14 that is controlled by the valve electronic control unit (not illustrated) to output torque that is required for the construction machine, for example, the excavator. The same process of generating the final output torque from the hydraulic pump 13 is used in the excavator system in the related art and the hybrid excavator system according to an embodiment of the present invention. In the embodiment of the present invention, a necessary or required torque of the system or a necessary or required torque of the hydraulic actuator 15 corresponds the output torque of the hydraulic pump 13, and it is preferable that the detection of the necessary or required torque of the system or the necessary or required torque of the hydraulic actuator 15 is performed by detecting the output torque of the hydraulic pump 13.

The memory means 40 stores the upper and lower baselines of the engine torque set per working mode of the engine 10. The upper and lower baselines of the engine torque set per working mode of the engine 10 become parameters of the control algorithm according to an embodiment of the present invention. The upper and lower baseline values of the engine output torque per working mode, which become the parameters of the baseline control algorithm, are derived and applied per working mode of the engine. Preferably, in an embodiment of the present invention, the engine rotating speed and the engine output torque of the idling operation points, which optimize the fuel efficiency, are derived and applied as control parameters. The detailed explanation of the control algorithm according to an embodiment of the present invention will follow.

The hybrid control means 50 receives and controls the working mode detected by the mode detection means 60 and the output torque of the hydraulic pump 13 detected by the torque detection means 70 through the control algorithm 51. Specifically, in accordance with the working detected by the mode detection means 60, the upper and lower baselines of the output torque of the engine 10 which are set in accordance with the working mode detected by the mode detection means 60 are compared with the output torque detected by the torque detection means 70. If the output torque of the hydraulic pump 13 is smaller than the lower baseline, the power generation of the motor-generator 17 is controlled so that the engine 10 is loaded as much as a short value, while if the output torque of the hydraulic pump 13 exceeds the upper baseline, the motor operation of the motor-generator 17 is controlled so as to supplement the output of the engine 10 as much as the excessive value.

Figure 5:
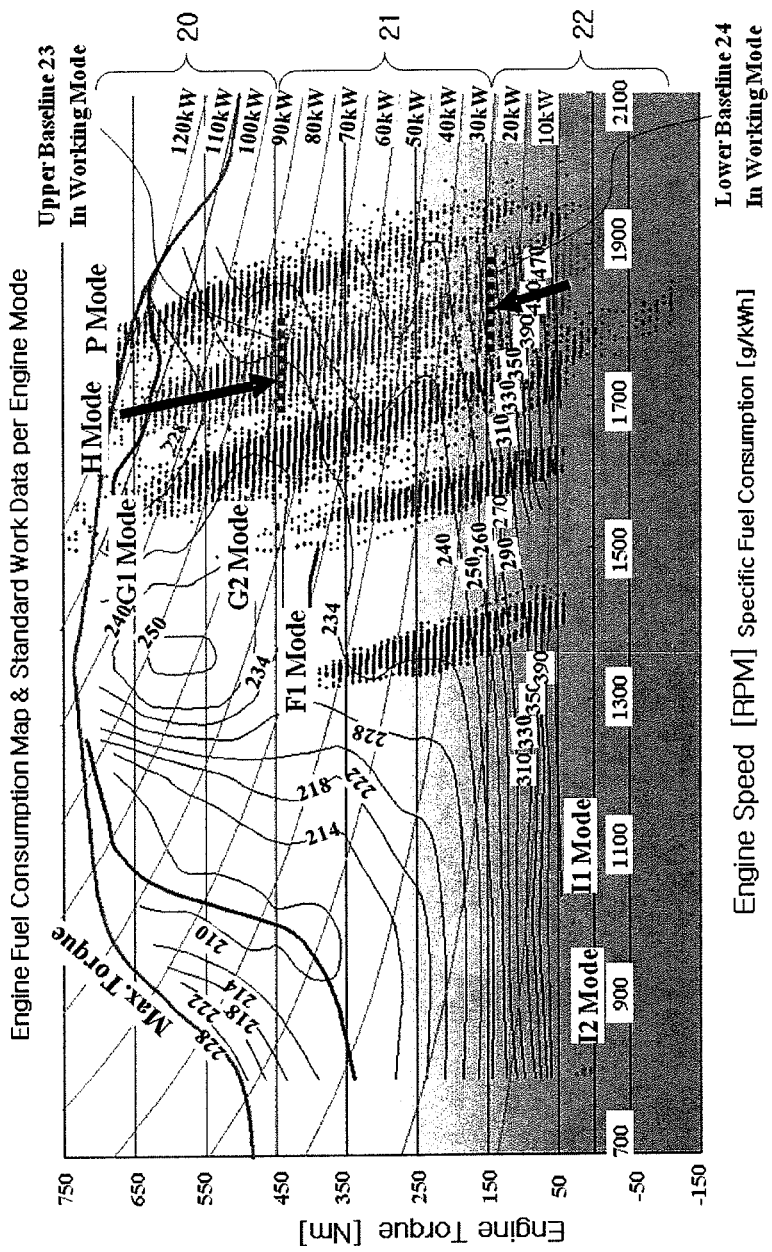
FIG. 5 is a view illustrating examples of engine fuel consumption of a hydraulic excavator in the related art, standard working data per engine mode, and upper and lower baselines according to an embodiment of the present invention.

Referring to FIGS. 3 and 5, in the case of an operation 20 that requires high output, by adding the electric motor-generator (M/G) 17 having high efficiency as a power source in addition to the engine 10, the engine 10 operates at a boundary point 1 (upper baseline) 23 where the efficiency corresponds to the gain, and the remaining output is put in charge of the motor operation of the electric motor-generator (M/G) 17. By contrast, in the case of an operation 22 that requires low output, the electric motor-generator (M/G) 17 is operated as a generator. By making the engine 10 be loaded through the power generation of the electric motor-generator 17, the engine 10 is operated at a boundary point 2 (lower baseline) 24 where the efficiency is the gain, and the electric energy generated by the electric motor-generator 17 is stored in the energy storage device, that is, energy storage system (ESS), 19. In this case, the generated electric energy is used for the motor operation of the motor-generator 17.

Preferably, if the output torque of the hydraulic pump 13, more preferably, the output torque of the hydraulic pump 13 and a charging state SOC of the energy storage device (ESS) 19 are transferred to the hybrid control means (hybrid-ECU) 50, for example, in the case of the operation 20 that requires high output, a torque output command of the electric motor-generator 17 is applied by the base line control algorithm 51, and the motor-generator 17 is operated as a motor by a motor-generator (M/G) driver 18 to output the output torque. In the case of the operation 22 that requires low output, a power generation command of the electric motor-generator 19 is applied by the baseline control algorithm 51, and the motor-generator 17 is operated as a power generator by the motor-generator driver 18 so as to consume the output of the engine 10 as the load of the engine 10.

The necessary torque of the hydraulic system, that is, the output torque of the hydraulic pump 13 that is required for the operation of the hydraulic actuator 15 is determined by the discharged flow rate through the adjustment of the swash plate 14 of the hydraulic pump 13, and the output 11 of the hybrid engine system that is the driving input of the hydraulic pump 13 is generated by the sum of the outputs of the engine 10 and the motor-generator 17. Specifically, in the case where the motor-generator 17 is operated as a motor by the baseline control algorithm 51, the output 11 of the hybrid engine system that is the driving input of the hydraulic pump 13 is generated by the sum of the outputs of the engine 10 and the motor-generator 17, while in the case where the motor-generator is operated as a generator by the baseline control algorithm 51, the output 11 of the hybrid engine system that is the driving input of the hydraulic pump 13 is generated by a value that is obtained by subtracting the load consumed by the motor-generator 17 from the output of the engine 10. Since the output torque of the engine 10 is the value that is obtained by subtracting the output torque of the motor-generator 17 from the output of the hybrid engine system, the operation region of the engine 10 is determined by adjusting the output of the motor-generator 17 through the hybrid control, and thus the fuel efficiency improvement effect can be obtained by leading the engine to operate in a region having good fuel efficiency.

In the embodiment of the present invention, the control parameters of the hybrid construction machine control algorithm (baseline control algorithm) include the upper baseline 23 and the lower baseline 24 of the engine output torque, and preferably, further include an engine rotating speed and an engine output torque of an idling generation point 30, so that one set of four kinds of values constitutes chromosome in a genetic algorithm and an optimum parameter set is derived through the genetic algorithm.

In an embodiment of the present invention, the baseline that is the parameter of the baseline control algorithm is derived from the fuel efficiency map of a fuel engine of the existing excavator as illustrated in FIG. 4 and the engine fuel consumption map as illustrated in FIG. 5. In FIG. 5, an X-axis value in the graph of FIG. 5 indicates revolutions per minute (RPM) as the rotating speed of the engine 10, and a Y-axis value indicate the output torque of the engine 10. Also, data that is drawn in the form of a contour in FIG. 5 indicates the fuel consumption amount of the engine 10, and the value indicated on the right side indicates the power of the engine 10. Referring to FIG. 5, the boundary points where the efficiency corresponds to the gain, that is, the upper baseline 23 and the lower baseline 24, are set. In FIG. 5, reference numerals 23 and 24 denote the set upper baseline and lower baseline of the output torque of the engine 10 in the case where the working mode is H-mode. That is, the boundary point where the fuel improvement corresponds to the gain is set as the baseline by comparing the fuel amount that is more consumed as the motor-generator performs the power generation as applying the torque load up to the lower baseline in the case of the operation that is below the lower baseline with the fuel amount that is less consumed as the motor-generator performs the motor operation in the case of the operation that is above the upper baseline. Preferably, the upper baseline 23 and the lower baseline 24 may be determined from the result of applying the actual standard working cycle of the excavator to simulations adopting the genetic algorithm, and the points where the fuel improvement is optimum per engine mode are set to have different values.

Referring to FIG. 2, in another embodiment of the present invention, the hybrid construction machine control system further includes a charge amount detection means 80 for detecting the charge amount SOC of the energy storage device 19. Preferably, the low limit value and the high limit value of the charge state SOC of the energy storage device, that is, a battery 19, are predetermined.

Figure 7:
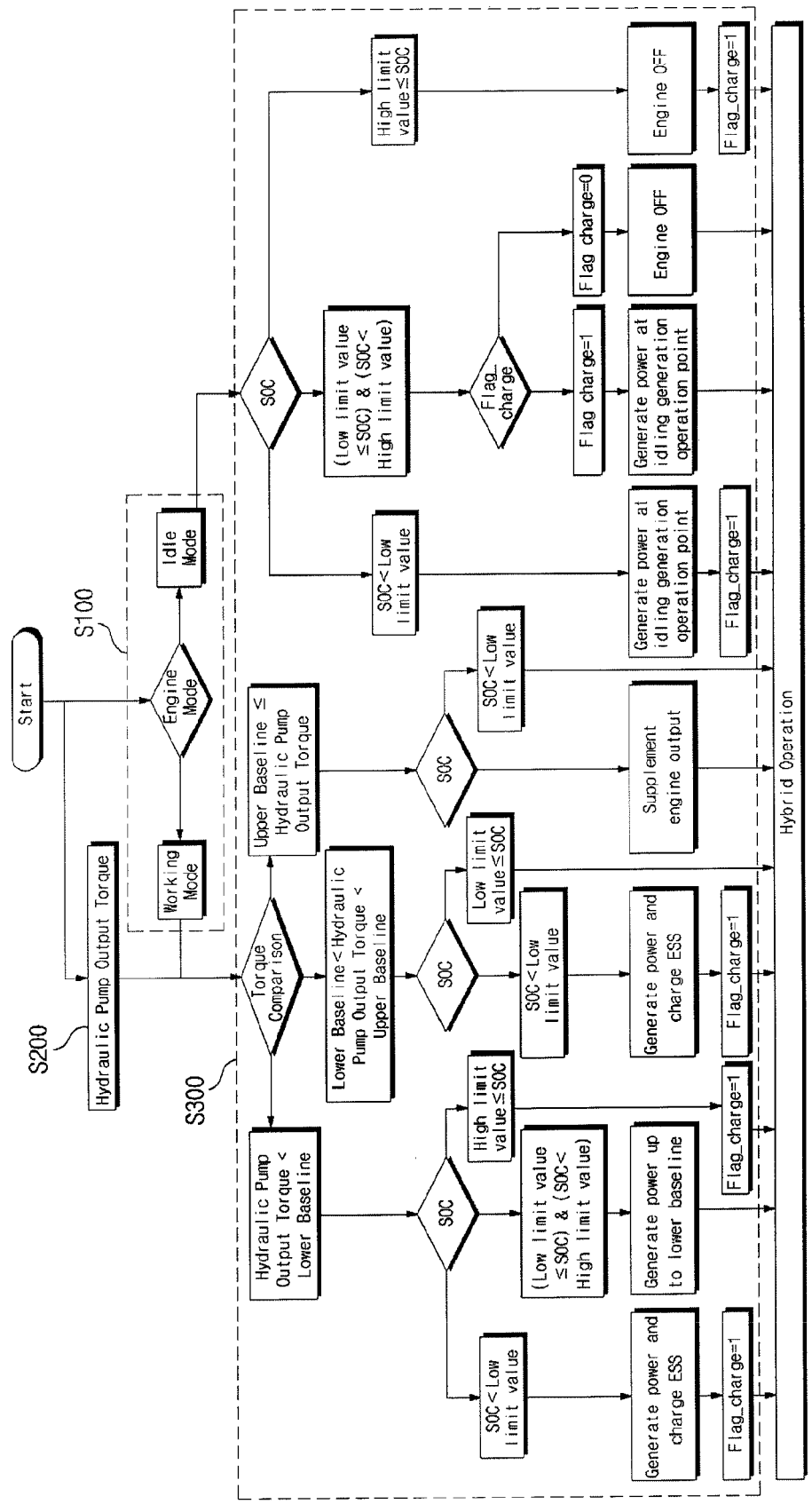
FIG. 7 is a baseline control algorithm diagram in a control system for a hybrid construction machine according to an embodiment of the present invention.

In this embodiment of the present invention, the hybrid control means 50 compares the upper and lower baselines of the output torque of the engine 10 that is set according to the working mode with the output torque of the hydraulic pump 13, and further performs a hybrid control by seizing the charge amount SOC of the energy storage device 19. Referring to FIG. 7 showing the flowchart of the baseline control algorithm in the hybrid construction machine control system according to an embodiment of the present invention, if the output torque of the hydraulic pump 13 is smaller than the lower baseline of the output torque of the engine 10, for example, if the output torque is in a region with a reference numeral "22" in FIG. 5, the motor-generator 17 is controlled not to generate the power in the case where the charge amount SOC detected by the charge amount detection means 80 is equal to or larger than the high limit value. Also, in the case where the charge amount SOC is smaller than the high limit value, the motor-generator 17 is controlled to generate the power.

In FIG. 7, if the output torque of the hydraulic pump 13 exceeds the upper baseline, for example, if the output torque is in a region with the reference numeral "20" in FIG. 5, the motor-generator 17 is controlled not to perform the motor operation in the case where the charge amount SOC detected by the charge amount detection means 80 is smaller than the low limit value, and the motor-generator 17 is controlled to perform the motor operation in the case where the charge amount SOC exceeds the low limit value.

Also, as illustrated in FIG. 5, if the output torque of the hydraulic pump 13 is in the range 21 of the lower baseline to the upper baseline and the charge amount SOC detected by the charge amount detection means 80 is equal to or smaller than the low limit value, the motor-generator 17 is controlled to generate the power.

In a preferred embodiment of the present invention, the hybrid construction machine control algorithm follows the control flowchart as illustrated in FIG. 7. The operation mode S100 of the engine 10 is determined, and in the case of a working mode, the motor-generator 17 operates as a generator when the output torque of the hydraulic system is lower than the lower baseline of the output torque of the engine 10, and the motor-generator 17 operates as a motor to supplement the engine 10 when the necessary torque of the hydraulic system, preferably, the output torque of the hydraulic pump 13 is higher than the upper baseline of the output torque of the engine 10. Only the engine 10 operates separately when the output torque of the hydraulic pump 13 is between the lower baseline and the upper baseline. However, if the charge amount SOC is sufficient in the generation region of the motor-generator 17, the motor-generator 17 does not generate the power, and if the charge amount SOC is insufficient when the engine 10 operates separately. If the charge amount SOC is insufficient in the motor operation region of the motor-generator 17, the motor does not operate.

Figure 6:
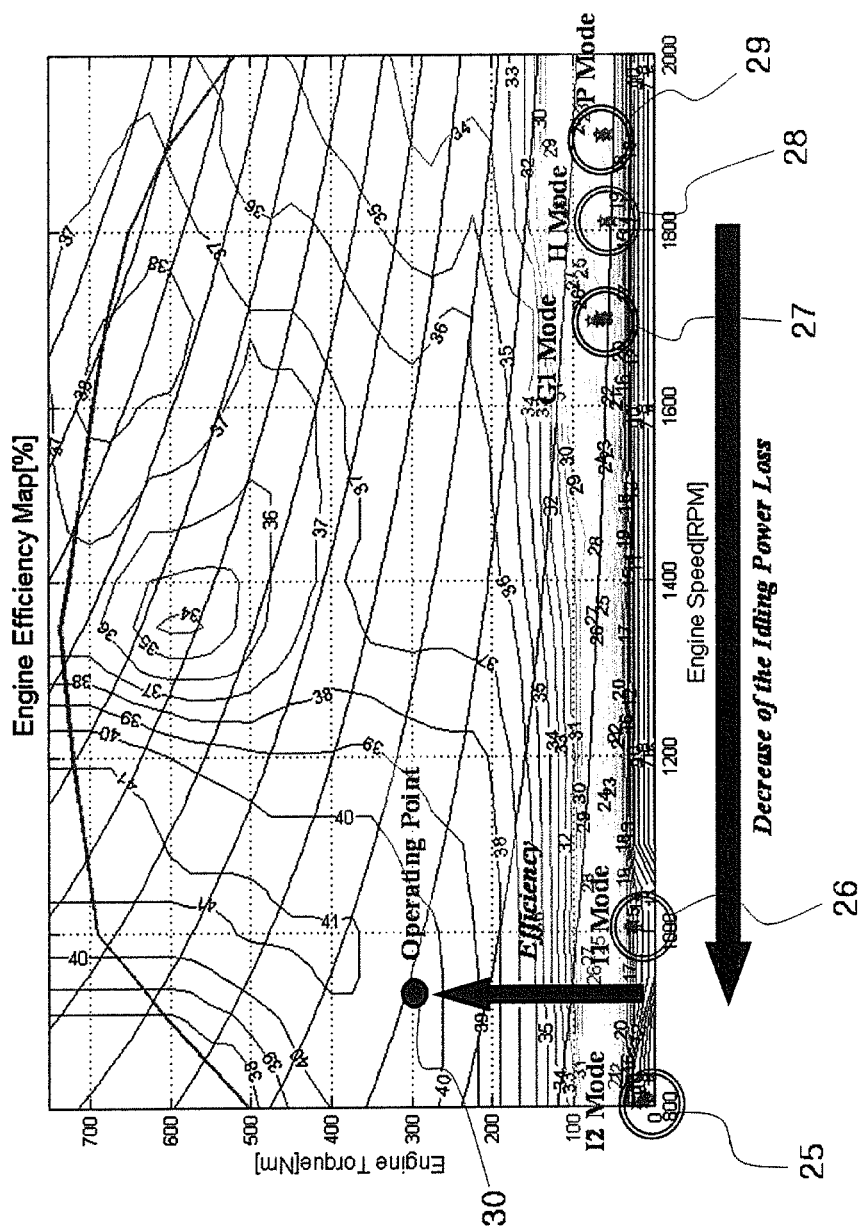
FIG. 6 is a view illustrating a movement example of an idling operation point adopted in an embodiment of the present invention.

A preferred embodiment of the present invention will be described with reference to FIG. 6. FIG. 6 is a view illustrating a movement example of an idling operation point adopted in an embodiment of the present invention.

In an embodiment of the present invention, the mode detection means 60 detects the start region 26 of the engine 10, the idling mode that corresponds to the output standby state 25, or low-torque idling regions 27, 28, and 29 per working mode of the engine 10. The memory means 40 stores the predetermined engine rotating speed at which the fuel efficiency is improved during the power generation operation of the motor-generator 17 in the idling states 25, 26, 27, 28, and and the operation point (power generation point) of the engine torque as the idling operation point (idling generation point) 30. If the idling modes 25 and 26 or the low-torque idling regions 27, 28, and 29 are detected by the mode detection means 60, the hybrid control means 50 controls the motor-generator 17 to generate the power by the driving of the engine according to the engine rotating speed and the engine torque of the operation point 30.

Referring to FIG. 6, there exist low-torque idling regions 27, 28, and 29 per working mode, idling mode 1 25 that is the engine start region, and idling mode 2 26 that corresponds to the output standby state. Since the respective idling regions are regions where the fuel efficiency is very low, the operation region of the engine 10 is shifted to the operation point 30 where the fuel efficiency improvement is maximized in the case of the generation operation, and the electric energy is stored in the energy storage device 19 by performing the idling generation in which all or almost all of the output of the engine 10 is used for the generation of the motor-generator 17.

Further, referring to FIGS. 6 and 7, according to a preferred embodiment of the present invention, the control system for a hybrid construction machine further includes a charge amount detection means 80 for detecting the charge amount SOC of the energy storage device 19. In this embodiment of the present invention, if the idling modes 25 and 26 or the low-torque idling regions 27, 28, and 29 are detected by the mode detection means 60, the hybrid control means 50 controls the motor-generator 17 to generate the power so as to charge the energy storage device up to the high limit value in the case where the charge amount detected by the charge amount detection means 80 is smaller than the low limit value. Also, if the charge amount detected by the charge amount detection means 80 is equal to or larger than the high limit value, the hybrid control means 50 controls the engine 10 to be turned off. If the charge amount detected by the charge amount detection means 80 is between the low limit value and the high limit value, the hybrid control means controls the generation of the motor-generator 17 so as to charge the energy storage device up to the high limit value.

Referring to FIG. 7, in the case of the idling mode, whether to perform the idling generation is determined according to the charge state. If the charge amount SOC is insufficient, the power generation is performed until the energy storage device (ESS) 19 is sufficiently charged, for example, up to the high limit value, while if the charge amount SOC is sufficient, for example, the energy storage device is charged up to the high limit value, the engine 10 is turned off to reduce the unnecessary fuel consumption. If the charge amount SOC is between the low limit value and the high limit value during the charging operation, the energy storage device is charged up to the high limit value. According to circumstances, if the energy storage device is discharged, for example, if the energy is supplied to the motor-generator 17, the engine 10 is turned off until the charge amount SOC reaches the low limit value.

Figure 9:
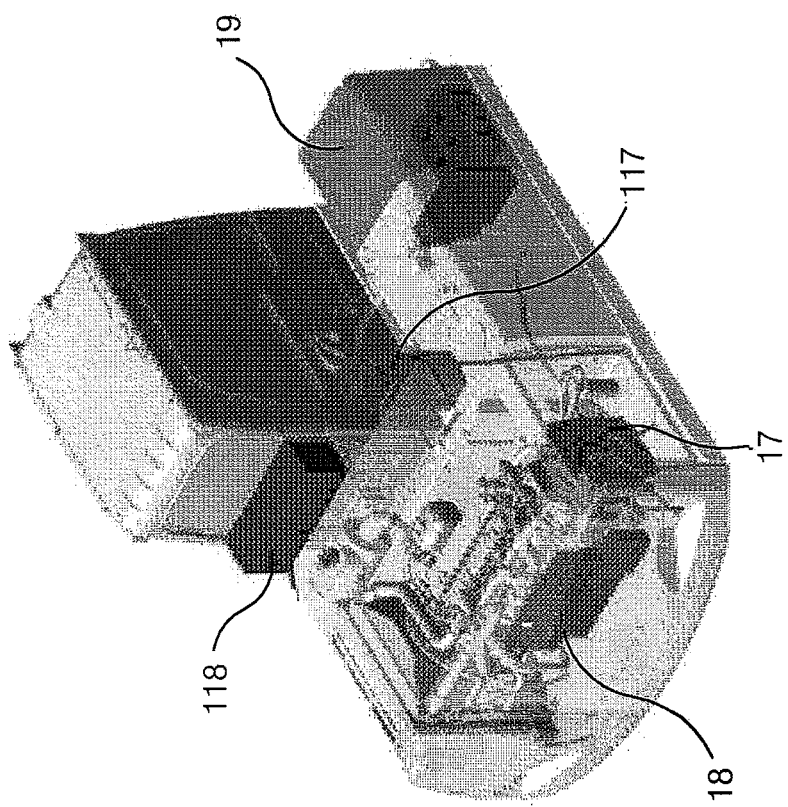
FIG. 9 is schematic diagram illustrating the configuration of a hybrid excavator according to another embodiment of the present invention.

Referring to FIG. 9, a hybrid excavator according to another embodiment of the present invention will be described. FIG. 9 is schematic diagram illustrating the configuration of a hybrid excavator according to another embodiment of the present invention. Referring to FIG. 9, the control system for a hybrid construction machine according to another embodiment of the present invention further includes a swing motor-generator 117 for an upper swing structure. The swing motor-generator 117 operates as a motor that accelerates a swing operation of the upper swing structure by energy supplied from the energy storage device 19, and operates as a generator that generates power by moment of inertia during deceleration of the swing operation of the upper swing structure. The swing motor-generator 117 is operated as a motor by a swing motor driver 118. The swing motor-generator 117 is used as a swing motor that replaces a swing hydraulic motor in the related art, and generates the power by the moment of inertia during the deceleration of the swing operation.

In this embodiment of the present invention, the hybrid control means 50 controls the swing motor-generator 117 to operate as a generator to charge the energy storage device 19 with generated electric energy when the swing operation of the upper swing structure is decelerated, and controls the supply of the electric energy from the energy storage device 19 for the motor operation of the swing motor-generator 117.

In another preferred embodiment of the present invention, the control system for a hybrid construction machine further includes an engine output calculation means (not illustrated) for calculating an engine output. In this embodiment of the present invention, the hybrid control means 50 checks the engine output calculated by the engine output calculation means for a predetermined time in a predetermined working mode, sets the upper and lower baselines of the engine torque according to the engine output at which the fuel efficiency is improved to store the upper and lower baselines in the memory means 40, and controls the power generation or the motor operation of the motor-generator 17 by applying the stored upper and lower baselines of the engine torque.

In another preferred embodiment of the present invention, the hybrid control means 50 checks the engine output calculated by the engine output calculation means for a predetermined time in a predetermined working mode, sets the engine rotating speed and the engine torque at the operation points according to the engine output at which the fuel efficiency is improved to store the engine rotating speed and the engine torque in the memory means 40, and controls the power generation of the motor-generator 17 by applying the engine rotating speed and the engine torque at the stored operation points.

An excavator digs up earth, loads earth on a dump truck, waits until another truck is prepared, and then performs again the digging and loading operations. The engine power required for such work of the excavator is illustrated in FIG. 8A. In the case where the excavator digs up earth in a large job site, the work is performed without a recess, and thus the engine power as shown in FIG. 8B is required.

There is a difference between the upper baseline 23 and the lower baseline 24 of the optimum engine torque with respect to the characteristics of the work as shown in FIGS. 8A and 8B. Also, the idling operation points 30 may differ according to circumstances. Accordingly, by checking the output of the engine 10 for a predetermined time and applying the upper baseline and the lower baseline, preferably the upper baseline, the lower baseline, and the operation point, which are appropriate to the engine output, the efficiency of the hybrid excavator becomes better.

Next, a control method for a hybrid construction machine according to another embodiment of the invention will be described in detail with reference to the accompanying drawings. The explanation of portions overlapping the explained portions of the control system for a hybrid construction machine according to an embodiment of the present invention as described above will be omitted. The control method for a hybrid construction machine is applied to the control system for a hybrid construction machine which includes an engine 10, a hydraulic pump 13 which is driven by the engine 10 to drive a hydraulic actuator 15 with discharged hydraulic fluid, a motor-generator 17 which is driven by the engine 10 to generate electricity and to drive the hydraulic pump 13 as a motor supplementing the engine 10, and an energy storage device which is charged with electric energy generated by the motor-generator 17 and which supplies the electric energy for motor operation of the motor-generator 17.

Figure 10:
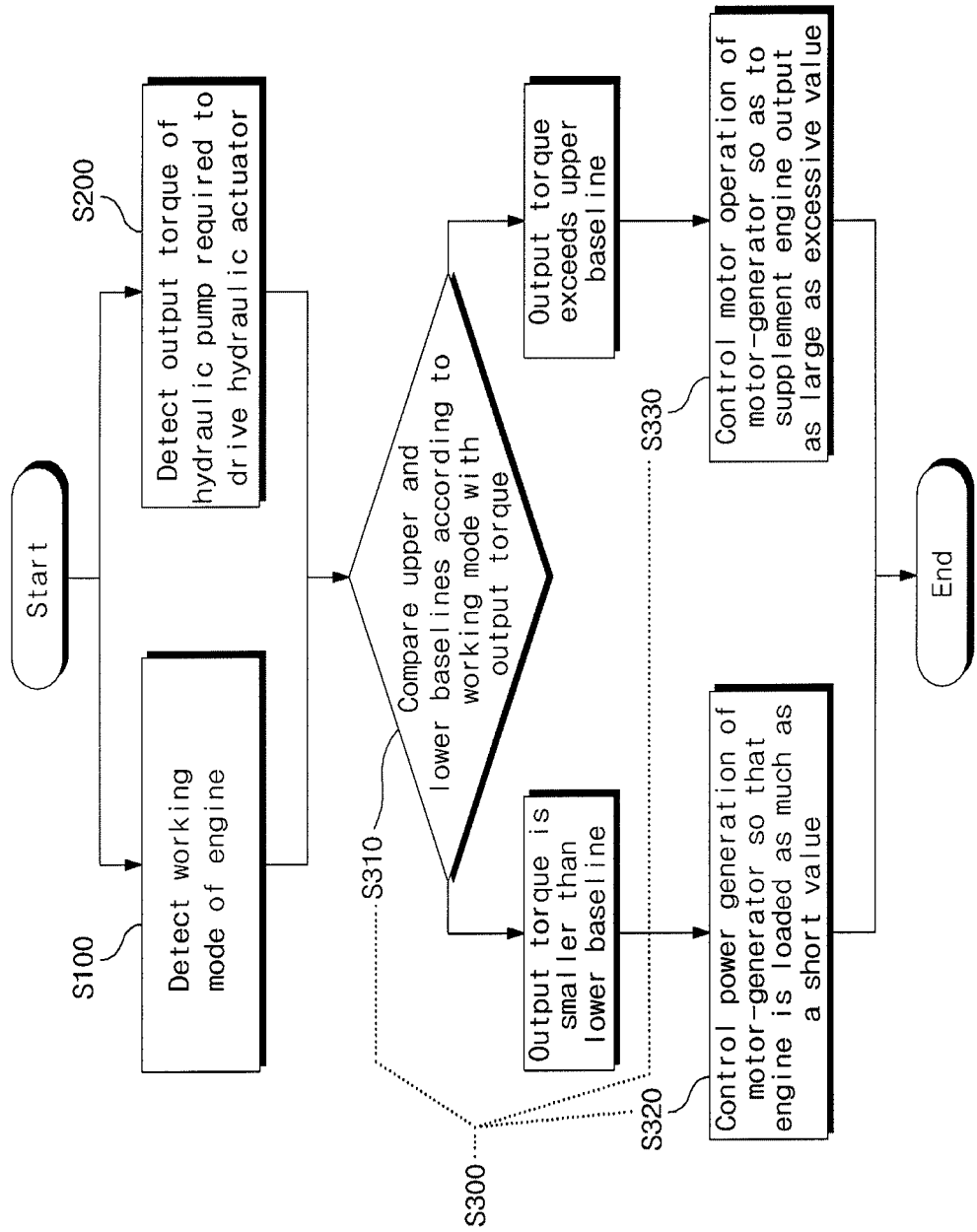
FIG. 10 is a flowchart illustrating a control method for a hybrid construction machine according to another embodiment of the present invention.

FIG. 10 is a flowchart illustrating a control method for a hybrid construction machine according to another embodiment of the present invention.

Referring to FIGS. 7 and 10, the control method for a hybrid construction machine according to another embodiment of the present invention includes a mode detection step S100 of detecting a working mode of the engine 10, a torque detection step S200 of detecting an output torque of the hydraulic pump that is required to drive a hydraulic system, e.g. a hydraulic actuator 15, and a hybrid control step S300.

The hybrid control step S300 first compares the output torque of the hydraulic pump 13 detected in the torque detection step S200 with the upper and lower baselines of a predetermined engine torque according to the working mode detected in the mode detection step S100 (step S310). If the output torque of the hydraulic pump 13 is less than the lower baseline, the hybrid control step controls the power generation of the motor-generator 17 so that the engine 10 is loaded as much as much as a short value (step S320). By contrast, if the output torque of the hydraulic pump 13 exceeds the upper baseline, the hybrid control step controls the motor operation of the motor-generator 17 so that the engine output is supplemented as much as an excessive value (step S330).

In the control method according to a preferred embodiment of the present invention, referring to FIG. 7, the mode detection step S100 detects a start region 25 of the engine, an idling mode that corresponds to an output standby state 26, or low-torque idling regions 27, 28, and 29 per working mode of the engine. If the idling mode or the low-torque idling regions are detected in the mode detection step S100, the hybrid control step S300 controls the motor-generator 17 to generate the power by the driving of the engine 10 according to the engine rotating speed and the engine torque at operation points 30 of a predetermined engine rotating speed and the engine torque at which the fuel efficiency is improved during the power generation operation of the motor-generator 17 in the idling states 25, 26, 27, 28, and 29.

There is a difference between the upper baseline 23 and the lower baseline 24 of the optimum engine torque with respect to the characteristics of the work as shown in FIGS. 8A and 8B. Also, the idling operation points 30 may differ according to circumstances. Accordingly, optimum baseline control parameters can be reset and controlled.

FIG. 11 is a flowchart illustrating a control method for a hybrid construction machine according to still another embodiment of the present invention. Referring to FIG. 11, the control method for a hybrid construction machine includes a step of resetting and controlling optimum baseline control parameters. Specifically, the hybrid control step S1300 in this embodiment of the present invention further includes the following processes.

In an engine output calculation step S1310, the engine output is calculated. In a corrected torque baseline setting step S1320, the engine output calculated in the engine output calculation step for a predetermined time in a predetermined working mode detected in the mode detection step S100 is checked, and the upper baseline 23 and the lower baseline 24 of the engine torque according to the engine output at which the fuel efficiency is improved are set and stored. In a corrected operation control step S1330, the power generation or the motor operation of the motor-generator 17 is controlled by applying the set upper and lower baselines of the engine torque.

The control method according to still another preferred embodiment of the present invention will be described with reference to FIG. 11. In a corrected torque baseline setting step S1321, the engine output calculated in the engine output calculation step for a predetermined time in a predetermined working mode detected in the mode detection step S100 is checked, and the engine rotating speed and the engine torque at the operation points 30 according to the engine output at which the fuel efficiency is improved are set and stored. Also, in a corrected operation control step S1331, the power generation or the motor operation of the motor-generator 17 is controlled by applying the set engine rotating speed and the engine torque at the operation points 30.

As described above, the preferred embodiments of the present invention have been described in detail with reference to the accompanying drawings. The aspects and features of the present invention and methods for achieving the aspects and features will be apparent by referring to the embodiments as described above with reference to the accompanying drawings. However, the present invention is not limited to the embodiments as described above, but can be implemented in diverse forms. Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A control system for a hybrid construction machine, including an engine, a hydraulic pump which is driven by the engine to drive a hydraulic actuator with discharged hydraulic fluid, a motor-generator which is driven by the engine to generate electricity and to drive the hydraulic pump as a motor supplementing the engine, and an energy storage device which is charged with electric energy generated by the motor-generator and which supplies the electric energy for motor operation of the motor-generator, the control system comprising:

a mode detection means for detecting a working mode of the engine;

a torque detection means for detecting an output torque of the hydraulic pump that is required to drive the hydraulic actuator;

a storage means for storing upper and lower baselines of an engine torque set per working mode of the engine;

a hybrid control means for comparing the output torque of the hydraulic pump detected by the torque detection means with the upper and lower baselines set according to the working mode detected by the mode detection means, controlling power generation of the motor-generator so that the engine is loaded as much as a short value if the output torque is less than the lower baseline, and controlling the motor operation of the motor-generator so that the engine output is supplemented as much as an excessive value if the output torque exceeds the upper baseline;

a charge amount detection means for detecting a charge amount of the energy storage device;

wherein the hybrid control means controls the motor-generator not to generate power if the charge amount detected by the charge amount detection means is equal to or larger than a high limit value, and controls the motor-generator to generate the power if the charge amount is smaller than the high limit value, in the case where the output torque is less than the lower baseline;

the hybrid control means controls the motor-generator not to operate as a motor if the charge amount detected by the charge amount detection means is equal to or smaller than a low limit value, and controls the motor-generator to operate as a motor if the charge amount exceeds the low limit value, in the case where the output torque exceeds the upper baseline; and the hybrid control means controls the motor-generator to generate the power if the charge amount detected by the charge amount detection means is equal to or smaller than the low limit value in the case where the output torque is within a range of the upper baseline to the lower baseline; and a charge amount detection means for detecting a charge amount of the energy storage device;

wherein in the case where the idling mode or the low-torque idling region is detected, the hybrid control means controls the power generation of the motor-generator so that the charging is made up to the high limit value if the charge amount detected by the charge amount detection means is equal to or smaller than the high limit value, controls the engine to be off if the charge amount detected by the charge amount detection means is equal to or larger than the high limit value, and controls the power generation of the motor-generator so that the charging is made up to the high limit value if the charge amount detected by the charge amount detection means is between the low limit value and the high limit value;

wherein the mode detection means detects a start region of the engine, an idling mode that is an output standby state, or a low-torque idling region per working mode of the engine;

the storage means stores operation points of a predetermined engine rotating speed and the engine torque at which the fuel efficiency is improved when the motor-generator generates the power in an idling state; and the hybrid control means controls the motor-generator to generate the power by the engine driving according to the engine rotating speed and the engine torque of the operation points if the idling mode or the low-torque idling region is detected by the mode detection means.

2. The control system according to claim 1, further comprising a swing motor-generator which operates as a motor that accelerates a swing operation of an upper swing structure by energy supplied from the energy storage device, and which operates as a generator that generates power by moment of inertia during deceleration of the swing operation of the upper swing structure;

wherein the hybrid control means controls the swing motor-generator to operate as a generator to charge the energy storage device with generated electric energy when the swing operation of the upper swing structure is decelerated, and controls the supply of the electric energy from the energy storage device for a motor operation of the swing motor-generator.

3. The control system according to claim 1, further comprising an engine output calculation means for calculating an engine output;

wherein the hybrid control means checks the engine output calculated by the engine output calculation means for a predetermined time in a predetermined working mode, sets the upper and lower baselines of the engine torque according to the engine output at which the fuel efficiency is improved to store the upper and lower baselines in the storage means, and controls the power generation or the motor operation of the motor-generator by applying the stored upper and lower baselines of the engine torque.

4. The control system according to claim 1, further comprising an engine output calculation means for calculating an engine output;

wherein the hybrid control means checks the engine output calculated by the engine output calculation means for a predetermined time in a predetermined working mode, sets the engine rotating speed and the engine torque at the operation points according to the engine output at which the fuel efficiency is improved to store the engine rotating speed and the engine torque in the storage means, and controls the power generation of the motor-generator by applying the stored engine rotating speed and the engine torque at the operation points.

5. A method comprising the steps of: (a) providing a hybrid construction machine, including an engine, a hydraulic pump which is driven by the engine to drive a hydraulic actuator with discharged hydraulic fluid, a motor-generator which is driven by the engine to generate electricity and to drive the hydraulic pump as a motor supplementing the engine, and an energy storage device which is charged with electric energy generated by the motor-generator and which supplies the electric energy for motor operation of the motor-generator; and (b) controlling the operation of the hybrid construction machine by:

a mode detection step of detecting a working mode of the engine;

a torque detection step of detecting an output torque of the hydraulic pump that is required to drive the hydraulic actuator; and a hybrid control step of comparing the output torque of the hydraulic pump detected in the torque detection step with upper and lower baselines of a predetermined engine torque according to the working mode detected in the mode detection step, controlling power generation of the motor-generator so that the engine is loaded as much as a short value if the output torque is less than the lower baseline, and controlling the motor operation of the motor-generator so that the engine output is supplemented as much as an excessive value if the output torque exceeds the upper baseline.

6. The control method according to claim 5, wherein the mode detection step detects a start region of the engine, an idling mode that is an output standby state, or a low-torque idling region per working mode of the engine; and if the idling mode or the low-torque idling region is detected in the mode detection step, the hybrid control step controls the motor-generator to generate the power by the engine driving according to the engine rotating speed and the engine torque at operation points of a predetermined engine rotating speed and the engine torque at which the fuel efficiency is improved during the power generation operation of the motor-generator in an idling state.

7. The control method according to claim 5, wherein the hybrid control step further comprises:
   an engine output calculation step of calculating an engine output;
   a corrected torque baseline setting step of checking the engine output calculated in the engine output calculation step for a predetermined time in a predetermined working mode detected in the mode detection step, and setting and storing the upper and lower baselines of the engine torque according to the engine output at which the fuel efficiency is improved; and
   a corrected operation control step of controlling the power generation or the motor operation of the motor-generator by applying the set upper and lower baselines of the engine torque.

8. The control method according to claim 6, wherein the hybrid control step further comprises:
   an engine output calculation step of calculating an engine output;
   a corrected operation point setting step of checking the engine output calculated in the engine output calculation step for a predetermined time in a predetermined working mode detected in the mode detection step, and setting and storing the engine rotating speed and the engine torque at operating points according to the engine output at which the fuel efficiency is improved; and
   a corrected power generation control step of controlling the power generation of the motor-generator by applying the set engine rotating speed and the engine torque at the operation points.

\* \* \* \* \*